(12) United States Patent  
Winters et al.

(10) Patent No.: US 6,796,670 B2  
(45) Date of Patent: Sep. 28, 2004

(54) SLEEVE MEDIA HOLDER

(75) Inventors: Gregory Edward Winters, 2121 El Hogar St., Ridgecrest, CA (US) 93555; Michael David Erlandson, Ridgecrest, CA (US)

(73) Assignee: Gregory Edward Winters, Ridgecrest, CA (US)

( * ) Notice: Subject to any disclaimer, the term of this patent is extended or adjusted under 35 U.S.C. 154(b) by 0 days.

(21) Appl. No.: 10/279,273

(22) Filed: Oct. 24, 2002

(65) Prior Publication Data

US 2004/0080930 A1 Apr. 29, 2004

Related U.S. Application Data

(62) Division of application No. PCT/US01/13704, filed on Apr. 26, 2001.
(60) Provisional application No. 60/199,787, filed on Apr. 26, 2000.

(51) Int. Cl.[7] .................................................. F21V 33/00
(52) U.S. Cl. ......................................... 362/34; 101/806
(58) Field of Search .......................... 362/34, 101, 806; 206/217; 215/6, 293; 248/346.11; 252/700; 220/902, 903

(56) References Cited

U.S. PATENT DOCUMENTS

| 4,336,574 A | 6/1982 | Goodman |
| 4,563,726 A | 1/1986 | Newcomb et al. |
| 4,886,183 A | 12/1989 | Fleming |
| 5,044,509 A * | 9/1991 | Petrosky et al. ............ 215/366 |
| 5,056,749 A | 10/1991 | Ige |
| 5,171,081 A * | 12/1992 | Pita et al. ..................... 362/34 |
| 5,504,663 A | 4/1996 | Tucker |
| 5,609,409 A | 3/1997 | Diehl |
| 5,624,177 A | 4/1997 | Rosaia |
| 5,671,998 A * | 9/1997 | Collet ........................ 362/101 |
| 5,695,270 A | 12/1997 | Collet |
| 5,931,383 A | 8/1999 | Palmer et al. |
| 6,062,380 A * | 5/2000 | Dorney ....................... 206/217 |
| 6,082,866 A | 7/2000 | Amedee |
| 6,322,227 B1 * | 11/2001 | Liu et al. ...................... 362/34 |
| 6,520,657 B1 | 2/2003 | DeNicola |
| 6,572,244 B1 | 6/2003 | Clark |
| 2003/0076672 A1 | 4/2003 | Head |
| 2003/0081408 A1 | 5/2003 | Tai |

* cited by examiner

Primary Examiner—Sandra O'Shea  
Assistant Examiner—Hargobind S. Sawhney  
(74) Attorney, Agent, or Firm—Bruce A. Jagger

(57) ABSTRACT

Chemiluminescent devices are attached to water bottles or similar drinkwear containers by a variety of holders to decoratively illuminate the contents of the container. A thin elongated chemiluminescent charge container is wound within the holder and supported there so that substantially the entire periphery of the drinkwear container is illuminated. The holders are reusable and useful with a variety of conventional drinkwear articles.

8 Claims, 8 Drawing Sheets

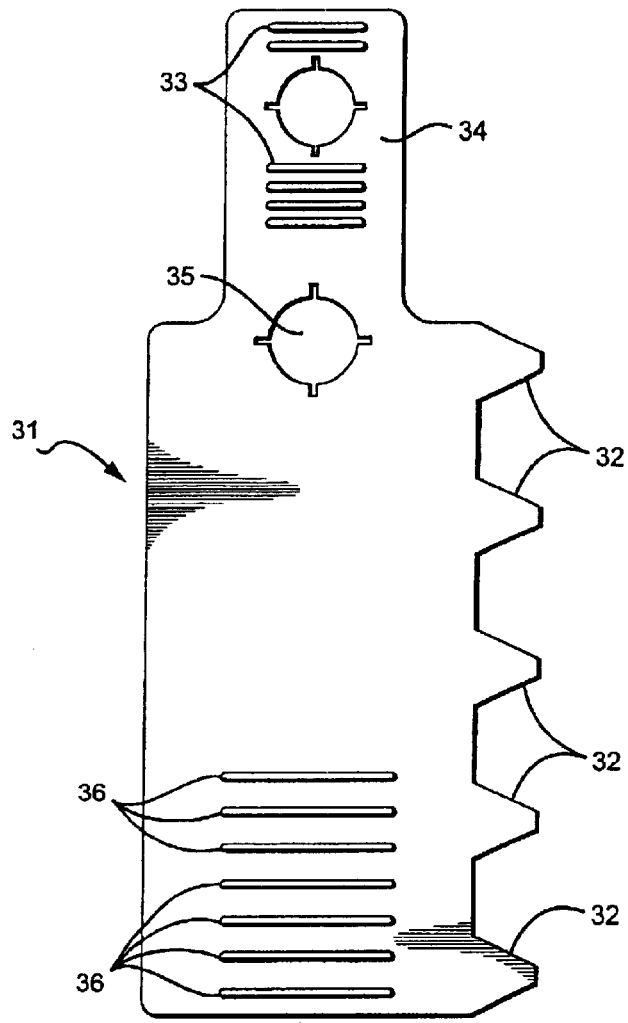
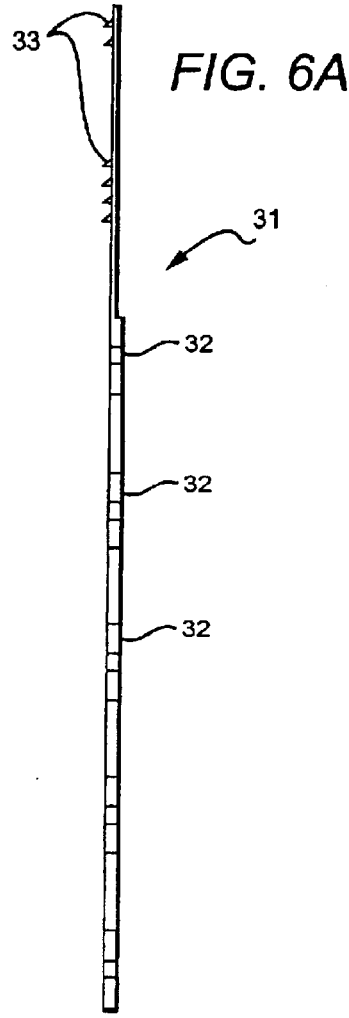
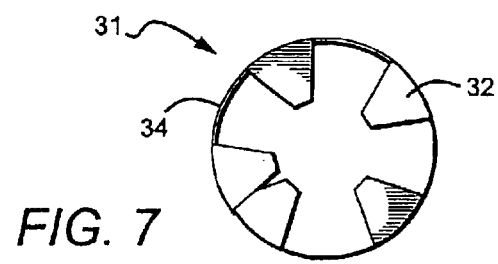

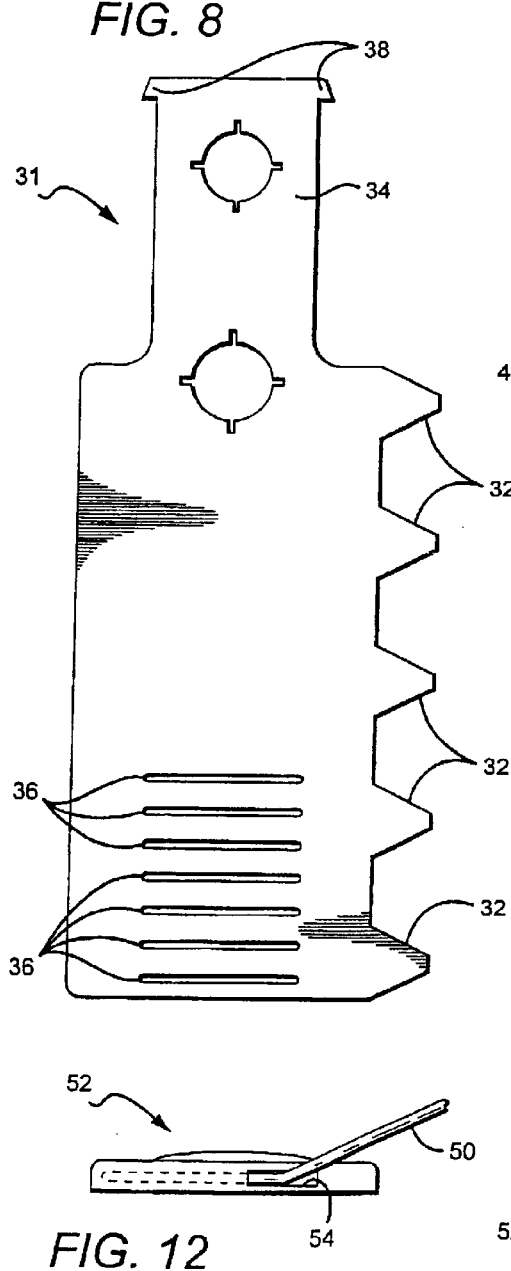
FIG. 8
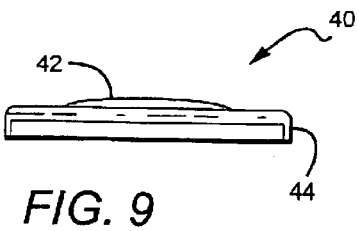
FIG. 9
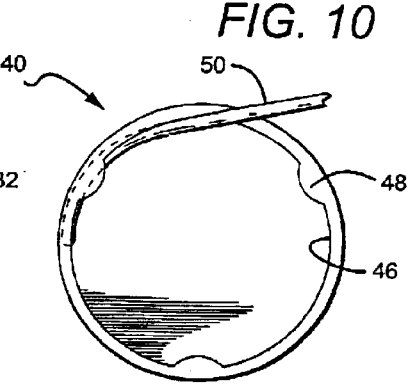
FIG. 10
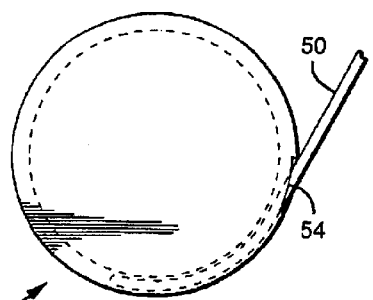
FIG. 12
FIG. 11

SLEEVE MEDIA HOLDER

RELATED APPLICATIONS

The benefit of U.S. of America Provisional Application Ser. No. 60/199,787, filed Apr. 26, 2000, and PCT/US01/13704, filed Apr. 26, 2001 are claimed.

BACKGROUND OF THE INVENTION

1. Field of the Invention

This invention relates to chemiluminescent lighting devices and media-containing devices, which are suitable for use as tumblers, coasters, bottle holders, attachment devices, and so forth.

2. Description of the Prior Art

Chemiluminescent devices are non-incandescent products, which produce light from the reaction of a mixture of chemical compounds. Originally, they were used as emergency lighting devices, which generally required twisting and shaking to mix the chemicals. Over time the development of chemiluminescent devices has led to smaller, cheaper commercial devices that offer a large number of colors and duration periods once activated.

There are numerous prior art patents such as Palmer et al. U.S. Pat. No. 5,931,383, for a Self Illuminating Drinking Straw, which shows how a sealed vial containing a first liquid reactant may be submerged within a body of a second reactive liquid material. The entire reactive system is fully contained within a translucent outer shell. Breaking the sealed vial or otherwise causing the two reactants to mix activates the light generating reaction to produce light. This light producing chemical reaction is completely contained within the outer shell and does not generate any significant heat. Similar light generating reactions have been employed in a variety of devices including, for example, wearing apparel or accessories for attachment to children as safety items, and the like. Such devices can be shaken, tied to clothing, so as to cause the child to glow in the dark. They have even been proposed for use as fishing lures. The chemiluminescent reactions upon which such devices are based are temperature sensitive. They last longer (slower rate of reaction) in colder temperature but do not glow as brightly as under warmer conditions.

The light generated by chemiluminesent devices is usually described as being due to the reaction of an activator, such as a catalyzed hydrogen peroxide mixture with an oxalate. This is an ever-evolving field as greater varieties of colors have led to greater popularity; greater duration increases demand and so forth. Many chemiluminescent devices are now made with nontoxic materials.

Lighted coasters are well known and have been proposed in a variety of configurations. See, for example, Goodman U.S. Pat. No. 4,336,574, for a Lighted Coaster For Drinking Glass. This proposed coaster includes batteries and a light bulb. The weigh of a glass on the coaster activates a switch for the light. Amedee U.S. Pat. No. 6,082,866 proposes an illuminated coaster that is removably secured to the bottom of a cup by means of an adhesive. The light is generated by a chemiluminescent reaction. The coaster appears to be adapted for only one use. Thereafter it would be discarded. The positioning of various light shielding elements is proposed to generate the desired illumination. The chemiluminescent lighted coaster proposed by Collet U.S. Pat. No. 5,695,270 is reusable. It contains pockets for receiving replenishment chemiluminescent charges. Another use of chemiluminescent reactions in drinking vessels is proposed by Pita et al. U.S. Pat. No. 5,171,081 for a Chemiluminescent Reactive Vessel. This vessel for the containment of food or drink has hollow walls, which are formed into at least two chambers. Breaking the barrier between the chambers activates the light generating reaction. No provision is made for replenishing the chemiluminescent charge. see also, Dorney U.S. Pat. No. 6,062,380. Specially configured drinking vessels with chambers for replaceably receiving self contained chemiluminescent charges have been proposed. See, for example, Newcomb et al. U.S. Pat. No. 4,563,726 for an Illumiated Chemiluminescent Drinking Mug, and Diehl U.S. No. 5,609,409 for a Chemiluminescent Stemmed Drinking Glass. The disclosures of these patents generally focus on the entertainment value of serving food and drink in glowing containers or on glowing devices.

Collet U.S. Pat. No. 5,671,998 for an Assembly Device Combining A Container And A Chemiluminescent Light Source purports to describe a jacket for drinkwear that is illuminated by a chemiluminescent light source. A glow stick is described as being inserted in a transverse bore in the base of a jacket, see, for example, FIG. 11.

Chemiluminescent light sticks also are sold with a clear plastic tube that fits over each end. High aspect ratio light sticks are generally flexible enough to be used as glowing bracelets and necklaces.

Use of battery-operated devices is also known in the art. See, for example, Rosaia U.S. No. 5,624,177 for an I.C.B. Illuminating Unity Ring For Drinking Glass. While these proposed devices usually use light bulbs, light emitting diodes or LED's may also be used with a battery.

Insulated sleeves for holding canned or bottled beverages with battery activated lamp displays thereon are proposed by Fleming U.S. No. 4,886,183 in his patent for a Beverage Container Holder.

Non-illuminated coasters that are removably mounted to cups that are specially configured to receive them are disclosed by Ige in his U.S Pat. No. 5,056,749 for a Receptacle And Coaster Assembly.

A liquid level indicator for a baby bottle has been proposed wherein a chemiluminescent liquid is caused to rise in a sight gauge by the weight of a baby bottle on the reservoir for the chemiluminescent liquid. The sight gauge is formed in a receptacle that encloses all but the nipple end of the baby bottle. See Petrosky et al. U.S. No. 5,044,509 for an Infant Nursing Bottle And Luminescent Indicator.

All of these devices and many more have been proposed as novelty and safety items based on the appeal and practicality of chemiluminescent reactions.

SUMMARY OF THE INVENTION

Transferable re-usable drinkwear container holders or sleeves, which can serve as attachments for tumblers, cups, cans, bottles, or any other form of beverage or food container, are configured to accommodate and position easily replaceable chemiluminescent charge containers so that they generally uniformly illuminate the periphery of an associated drinkwear container or article. Generally, such chemiluminescent charge containers are proportioned so as to be disposed around substantially the entire periphery of at least the base of an associated drinkwear article so that the illumination is generally uniform and concentrated at the periphery of the drinkwear article. The holders have proximal and distal ends, and generally. annular peripheries that correspond generally to the generally annular peripheries of the drinkwear articles to which they are to be attached. The distal end is generally adapted to receive the bottom of the associated drinkwear article. Such attachments may be made of transparent or translucent materials, as well as luminescent materials. Opaque or reflective materials may be used in certain areas of the attachment to control or direct light, if desired. The attachments or holders according to the present invention are small and light-weight but can fit interchangeably onto a variety of containers, for example bottles, drinking glasses and so forth. Preferably, such attachments are configured so that the container for the chemiluminescent charge can be manually inserted and removed within a few seconds. To this end, the bottom of the attachment can be left mostly open with only enough structure to support the container for the chemiluminescent charge in the desired position, and to prevent the bottom of the associated drinkwear container from sliding entirely through the holder. The container for the chemiluminescent charge can be quickly inserted through the open bottom and engaged with the support structure. The support structure can comprise, for example, a radially inwardly projecting peripheral shelf or groove in the generally annular wall of the attachment. The shelf or groove may extend for the full circumference of the holder, or for only a part of it, and there may be more than one such shelf. Typical preferred containers for the chemiluminescent charge comprise long slender tubes that are flexible enough to be coiled into a form, which approximately follows and is approximately the same length as the outer periphery of the drinkwear article with which it is to be associated. Typical such containers are cylindrical tubes having diameters of from approximately 4 to 10 millimeters and lengths of from approximately 500 to 1000 millimeters.

The holder or attachment, preferably in the region of its base or bottom, can hold a commercially available chemiluminescent light source such as a chemiluminescent disc, light stick, or the like, which preferably is activated just prior to insertion in the holder. The holder, light source, and desired transparent or translucent drinkwear article are assembled so that the article is held by the holder with an activated light source in operative position to substantially uniformly illuminate the article. The activated chemiluminescent device emits light, which makes the fluid in the container appear to glow. The holder may also glow depending upon its construction. Once the chemiluminescent reaction ends, a new light source can be activated and inserted in the holder. The chemiluminescent radiates from the entire body of the chemiluminescent mixture. This is unlike a battery activated point light source where there will be areas that are not able to glow or emit light.

In a preferred embodiment of the invention light sticks can be inserted through the bottom or side of the holder so the light stick is coiled within the holder. For a traditional light stick, the bending breaks the inner container, letting the chemiluminescent process begin.

Another embodiment of the invention uses, for example, a flexible sleeve, which is wrapped around the bottle and holds either a disc or light sticks against the bottle to permit it to be illuminated by the chemiluminescent devices.

Yet another embodiment of the present invention uses a container disc or other chemiluminescent charge container, which is matched to a recess in the vessel to assure a snug fit of the chemiluminescent container to the vessel.

A further embodiment uses a disc designed to allow insertion of a light stick through an opening in the side of the disc. This last embodiment may be made small enough to allow a cap cover version of the present invention such that the illumination from the light stick illuminates the drinkwear article from the top of the article.

Other embodiments of the invention have a ring such as a sleeve or collar, which goes around the article. The ring has at least one holder for a chemiluminescent device. The ring may be a partial ring, which tends to close resiliently on the article and holds the light source. If the ring is made of elastic material with a notch for a light stick on the interior surface it can slide over the entire article as desired.

Another embodiment of the invention has a collar, which can hold a chemiluminescent charge container and fit over the top of an article such as a bottle.

Another embodiment of the invention has flexible leaves above a chemiluminescent disc of similar light source. An elastic band may be used to hold the leaves to a container. This has an alternate embodiment where two half rings are place about the container.

BRIEF DESCRIPTION OF THE DRAWINGS

FIG. 5 is an alternate embodiment of the invention.

FIG. 6A is a side view of FIG. 5 uncoiled.

FIG. 7 is a bottom view of the FIG. 5 embodiment when it is coiled.

FIG. 8 is an alternate embodiment of the invention.

FIG. 9 is an alternate embodiment of the invention.

FIG. 10 is a bottom view of FIG.9 embodiment.

FIG. 11 is an alternate embodiment of the invention.

FIG. 12 is a side view of the FIG. 11 embodiment.

DESCRIPTION OF THE PREFERRED EMBODIMENT

Figure 1:
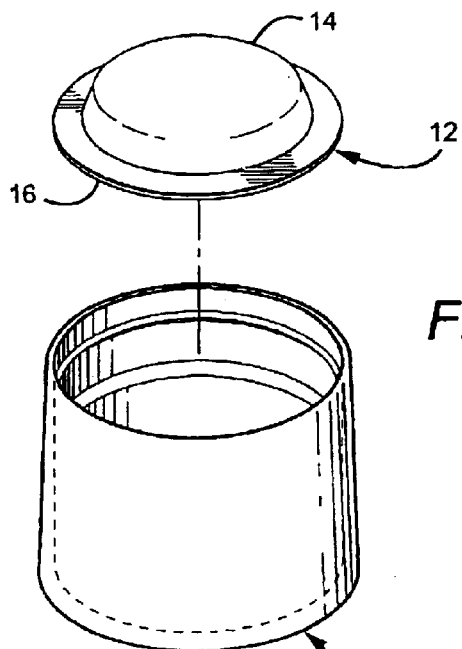
FIG. 1 is a perspective view of one embodiment of the present invention.

FIG. 1 is for one embodiment of the present invention. A holder or attachment 10 is shaped to fit over the bottom of a drinkwear article, such as, for example, a water bottle, cup, glass, or other such article or container. Holder 10 may be made of plastic. The plastic may be opaque or translucent. Combinations of opaque or translucent material may be made to permit predetermined patterns. Types of plastic that may be used are PETE, a common rigid plastic, polyethylene, polypropylene, and santoprene, an elastomeric plastic, or the like. These types of plastic may be translucent or transparent. For purposes of example only, a water bottle will be referred to as the container. Water bottles are usually made of clear plastic so the contents can be readily viewed. Holder 10 is shaped to fit over the bottom of the desired container and provide a snug fit to the sides of the water bottle. A chemiluminescent source such as a chemiluminescent disc 12 having a pocket 14 with standard chemiluminescent materials and a handling edge 16 fits within holder 10.

Pocket 14 contains the activator and oxalate for the chemiluminescent reaction. Ampules, not shown, within pocket 14 are broken by pressing on pocket 14 to permit the reagents to intermix so that the chemical reaction will commence. Pocket 14 can be pressed to break the ampule(s) prior to insertion, during insertion, or by pressing the water bottle down on pocket 14 when the water bottle is inserted into holder 10. Such chemiluminescent discs are commercially available. Shaking of chemiluminescent disc 12 after the chemical reaction is commenced brings a quick glow of a desired color preselected at the time the disc is manufactured. One such commercial manufacturer is Omniglow Corporation.

The glow from chemiluminescent disc 12 appears in the fluid of the inserted drinkwear container or article. If a water bottle is used, the water appears to glow with the color of chemiluminescent disc 12. Of course the water is merely a medium allowing the light to pass through, but the light scatters in the water creating this visual effect. If a luminescent material is used for holder 10, then holder 10 both scatters light like the water or other fluid and does itself glow from the illumination it has received from outside lighting or by lighting from chemiluminescent disc 12. This permits two color effects where holder 10 has a different glowing color than the water. Further variations on these effects occur if the fluid in the container is not clear but has a predetermined color. Luminescence may be added to plastic in any of the ways well known. As an example, adding glow powders to the plastic such as zinc sulfide and strontium aluminate will add such luminescent properties to plastic.

Figure 2:
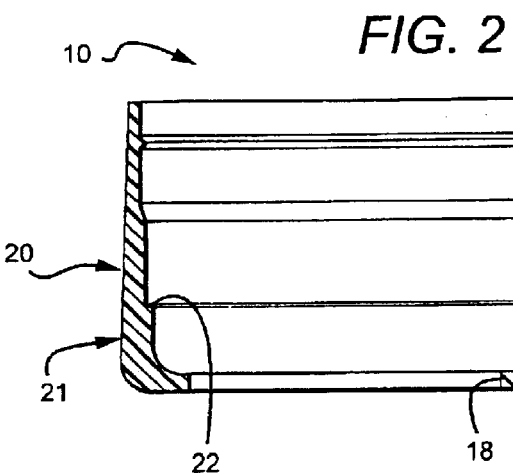
FIG. 2 is a cutaway view of a holder shown in FIG. 1.

FIG. 2 is a side cutaway view of holder 10 without chemiluminescent disc 12. A hole 18 is shown in the bottom of holder 10. This allows chemiluminescent disc 12 to be quickly pushed out if a replacement is desired. As is known to those skilled in the art, holder 10 may be made of a single piece of plastic by injection molding or other known techniques. Wall 20 has a height and thickness that can vary as desired. As shown, wall 20 is generally cylindrical, but this is not a functional requirement of the invention. Holder 10 may be formed to any shape desired so long as it is adapted to be mounted to a drinkwear article. The interior side of wall 20 is shown contoured. Contouring is a matter of design. Contouring is not a requirement for the device to function. The lower portion 21 is contoured to hold disc 12. If disc 12's largest diameter is less than that of the bottle to be held by holder 10, one design option is to provide a lip 22, which will support the bottle to keep it from pressing on disc 12.

Figure 3:
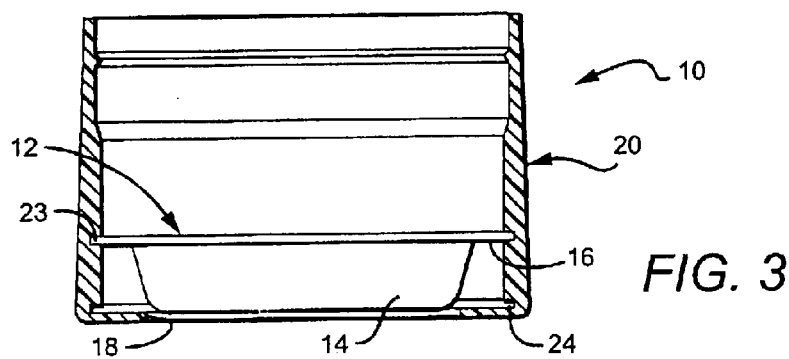
FIG. 3 is an alternate cutaway view of a holder as shown in FIG. 1.

FIG. 3 is another cutaway view of a holder 10. The interior shaping of wall 20 now has recessed ring 23, which is large enough to hold handling edge 16 of disc 12. As shown in FIG. 3, recessed ring 23 is placed above the bottom of holder 10 a distance adequate to keep the height of pocket 14 contained within holder 10. This is not a functional requirement of the present invention, but is a prudent safety measure to limit damage to pocket 14 that might occur if it protrudes out the bottom of holder 10. As a further variation, a recessed ring 24 may be used near the bottom of holder 10. As shown in FIG. 3 a disc 12 may be inserted so handling edge 16 fits into recessed ring 24 with pocket 14 either above or below recessed ring 24. This is a design choice. If disc 12 is to emit light in all directions, the only decision is whether pocket 14 should extend out of the bottom of holder 10. If disc 12 is not to emit light out of one side, say it is coated with a reflecting material, not shown, then the bottom of disc 12 should be the bottom of holder 10 with disc 12 inserted so all light reflects or is emitted upwards into the container. The material between recessed rings 23 and 24 may be removed forming one large notch, not shown. If such a design is chosen the size of hole 18 can be modified to keep disc 12$i$ from extending from holder 10.

Figure 4A:
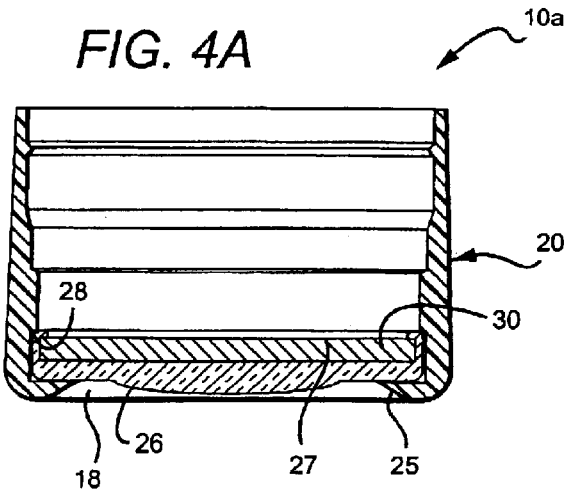
FIG. 4A and FIG. 4B show a side cutaway view of an alternate embodiment.
Figure 4B:
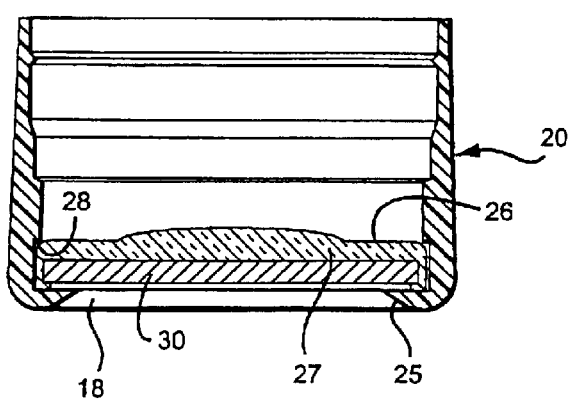

FIG. 4A is an alternate embodiment of the present invention. Holder 10$a$ is shown in a side view cutaway. A small lip 25 is left in the bottom of holder 10$a$. A disc 26 made from transparent plastic or similar material with an open side has an internal lip 27 and an exterior lip 28, which is inserted into holder 10$a$ such that the open side is within holder 10$a$ and exterior lip 28 rests on lip 25 of holder 10$a$. A chemiluminescent light stick or disk 30 is inserted under interior lip 27. Chemiluminescent light sticks have been known for many years and are commercially available chemiluminescent sources. The coiling or manipulation of chemiluminescent light stick or disk 30 snaps the internal components to initiate the chemical reaction. The combined effect of interior lip 27 and exterior lip 28 may provide support for the drinkwear container inserted into holder 10$a$ if the base of the drinkwear article is smaller than hole 18. Recessed rings as shown previously may also be used to hold disc 26 in holder 10$a$. FIG. 4B shows that disc 26 may be inserted with the open side down if so desired.

Figure 6B:
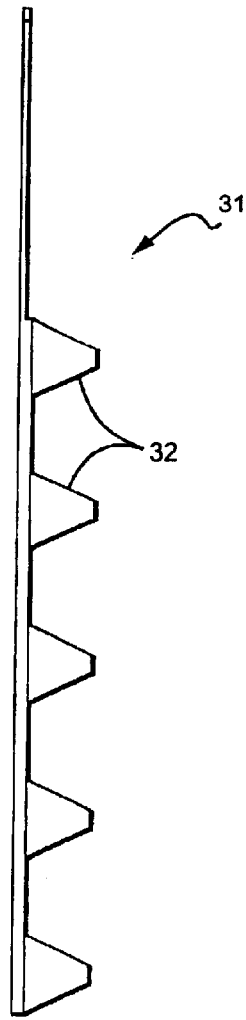
FIG. 6B is a side view of FIG. 5 with tabs bent.

FIG. 5 is another embodiment of the present invention. Holder 31 is made, for example, of a flexible material such as a plastic. Tabs 32 are attached to holder 31 and may be heat-treated to bend to form a 90 degree angle to holder 31. Holder 31 is adapted to being wrapped around the associated drinkwear container and to have a fastener element in the form of tongue 34 retentitively engaged with a fastener retainer element such as one of slits 36. Tabs 32, when bent, face generally radially inward to form shelves disposed around the bottom of the container. A chemiluminescent disc or coiled charge container can either be put against the bottom of the container before holder 31 is wrapped around it, or inserted into the cavity formed by the radially inwardly bent tabs. If chemiluminescent light sticks are used, a ridge not shown may be formed in holder 31 such that the chemiluminescent light stick may be inserted after wrapping holder 31 around the container. Raised ribs 33 are angled as shown in FIG. 6A such that when inserted through any of slots 36 ribs 33 prevent tongue 34 from. easily sliding out. Tabs 32 are shown in FIG. 6A as they might be formed as part of a one piece molding. FIG. 6B shows the position of tabs 32 after they have been bent to form a bottom. This may be done via a heating process that leaves tabs 32 in a fixed position. An opening 35 allows an alternate way for a chemiluminescent disc to be held against the container. This can be used with or without the placing of a chemiluminescent disc in the bottom as already described. A second opening, similar to 35, is shown in tongue 34 in FIG. 5 as a possible packaging technique, which allows holder 31 to be attached to the top of a water bottle until it is to be used.

FIG. 7 is a bottom view of holder 31 when it is coiled around a container. Tabs 32 of FIG. 6B now form a bottom as shown.

FIG. 8 is another embodiment of the FIG. 5 device. Raised ribs 33 are replaced by flexible serrated outer edges 38 on tongue 34. Edges 38 slide through desired slot 36 and snap into place to prevent slippage of tongue 34. Tabs 32 are shown in FIG. 8 as to how a single piece of plastic can be formed. Tabs 32 are then heat treated to form the 90 degree bend described above.

FIG. 9 is a side view of a container disc 40 for another embodiment of the present invention. This method is a variation of the one shown in FIG. 4A above. In FIG. 9 a container disc 40 with a raised crown 42, which is designed to fit into a recess common to the bottom of bottles. The bottom of container disc 40 is open. An edge 44 goes around container disc 40. Adhesive can be applied to edge 44 so that when placed against the bottom of a bottle raised crown 42 assures centering and the adhesive on edge 44 holds container disc 40 secure to the bottle. If a clear adhesive is used, edge 44 is not required and the adhesive can be applied to the top of raised crown 42 to hold container disc 40 to the container. Pressing on container disc 40 starts the chemiluminescent chemical reaction as described above.

FIG. 10 is a bottom view of FIG. 9. An interior edge 46 creates a lip around the circumference of the bottom of container disc 40. Tabs 48 may be attached to and project radially inwardly of interior edge 46. All of these elements may be made by vacuum forming, injection molding or similar processes. A chemiluminescent light stick 50 is inserted or coiled under tabs 48. As described previously, the bending of chemiluminescent light stick 50 breaks the containers within it to permit the chemical reaction to commence. In FIG. 10, chemiluminescent light stick 50 is only shown partially inserted. To be used properly, it has to be completely inserted.

FIG. 11 is an alternate embodiment of the FIG. 9 and FIG. 10 device. In this variation container disc 52 does not have an open bottom but instead is a hollow disc with an opening 54 on one side. Light stick 50 is inserted through opening 54. As light stick 50 is pushed in, it coils activating the chemical reaction. FIG. 12 is a side view of FIG. 11.

Figure 13:
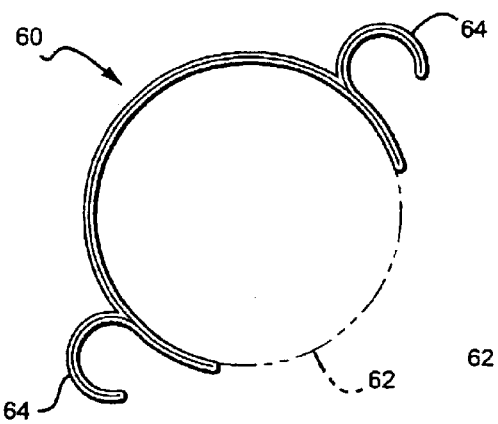
FIG. 13 is an end view of another embodiment of the present invention.

FIG. 13 is an alternate device employed according to the present invention to clamp light sticks to drinkwear containers. A ring 60 is made of plastic or similar material that has some resilience. Ring 60 provides a snug fit when snapped or slid around a drinkwear container 62. For purposes of example, FIG. 13 may be considered either a top or bottom view of a ring 60 around a container 62. Attached to ring 60 is at least one additional ring 64. In FIG. 13 two additional rings 64 are shown but the total number is a design option. These additional rings work in a similar fashion as ring 60 except that they are designed to hold light sticks. It is anticipated that the light sticks will be smaller than container 62 although that is not required for this device to function. As shown in FIG. 13 ring 60 and additional rings 64 are shown as partial rings. This allows the material forming them to have some elasticity to close and grip either the container or light sticks. As a matter of design the rings may be closed and slide over the container and light sticks. This option is not shown.

Figure 14:
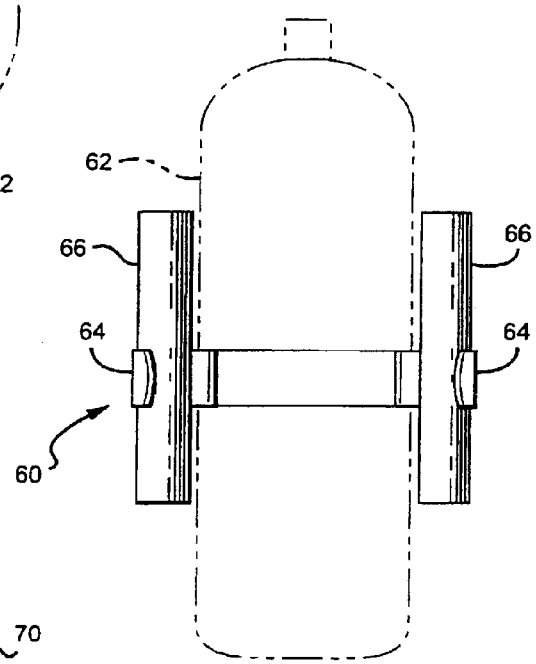
FIG. 14 is a side view of the FIG. 13 embodiment.

FIG. 14 is a side view of FIG. 13 with ring 60 on container 62 and with light sticks 66 in each of the two additional rings 64.

Figure 15:
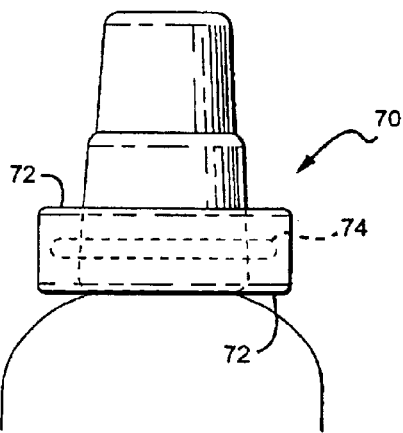
FIG. 15 is another embodiment of the invention.

FIG. 15 is an example of how to make a media sleeve for the top of a drinkwear container. A ring 70, made of plastic as previously described has interior lips 72 at the top and bottom which permit a light stick 74 to be coiled inside ring 70 such that lips 72 prevent light stick 74 from slipping out either the top of bottom of ring 70. The interior circumference of lips 72 provides a snug fit to the exterior circumference of the container top.

Figure 16:
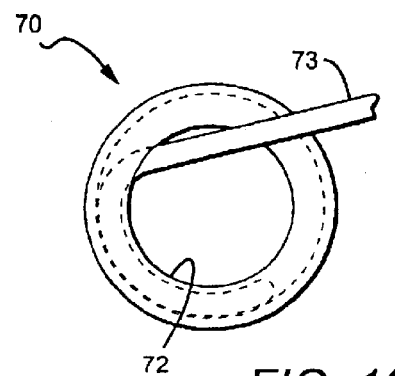
FIG. 16 is a top view of the FIG. 15 embodiment.

FIG. 16 is a top view of FIG. 15 with a light stick 73 partially inserted.

Figure 17:
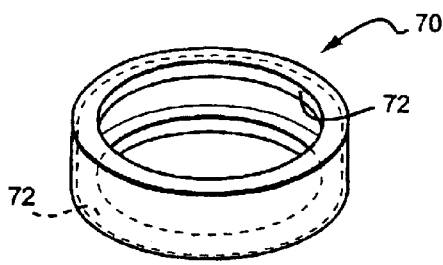
FIG. 17 is a perspective view of FIG. 15.

FIG. 17 is a perspective view of FIG. 15.

Figure 18:
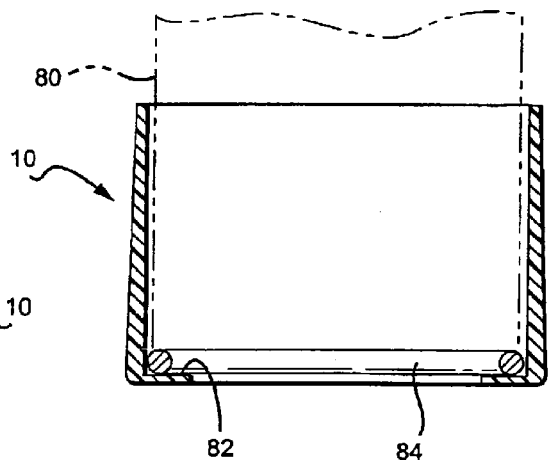
FIG. 18 is a cross section view of one embodiment of the invention.
Figure 19:
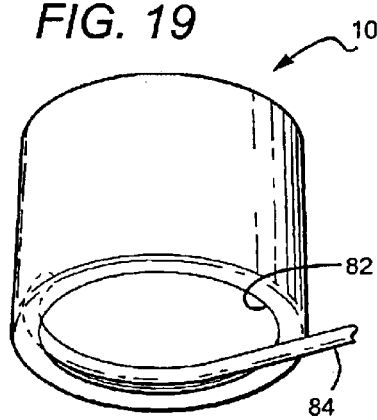
FIG. 19 is a perspective view of the FIG. 18.

FIG. 18 is an alternate embodiment of the present invention. It combines some of the features of FIGS. 4A and 4B and FIG. 15. Holder 10 fits snugly over the bottom of drinkwear container 80 and is held there, for example, by frictional engagement. It can be either a slip fit or snap-on design. It may be contoured as previously taught. FIG. 18 shows an uncontoured version. A radially inwardly projecting containment ring 82 is formed in the bottom of generally cylindrical holder 10. Ring 82 serves as a ledge or boss to support a coiled chemiluminescent charge container 84. Ring 82 may be made, for example, by molding a lip onto holder 10. FIG. 19 is a perspective view of FIG. 18 showing a coiled light stick 84 partially inserted in operative position. Holder 10 is reusable and adapted to be used, for example, on a variety of conventional glasses of varying heights with approximately the same diameter bases.

Figure 20:
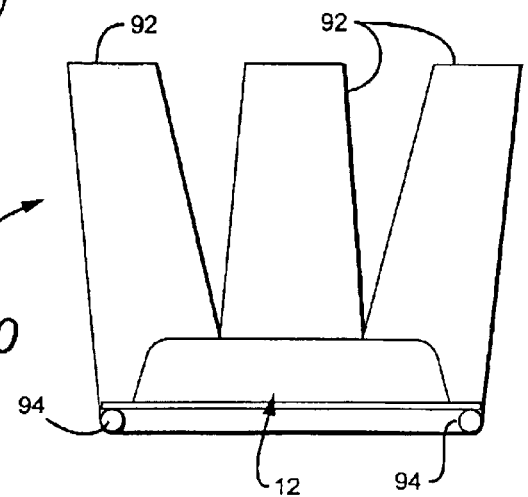
FIG. 20 is a alternate embodiment of the invention.

FIG. 20 shows still another embodiment of the invention. A chemiluminescent charge container in the form of disc 12 is placed within a holder or attachment 90. Holder 90 may be made, for example, out of rigid plastic with a plurality of leaves 92. Holder 90 also has a bottom lip 94, which supports disc 12. When a container is placed above disc 12, at least one closure band 96, shown in FIG. 21, such as a rubber band, is placed over leaves 92 to hold them to the container.

Figure 21:
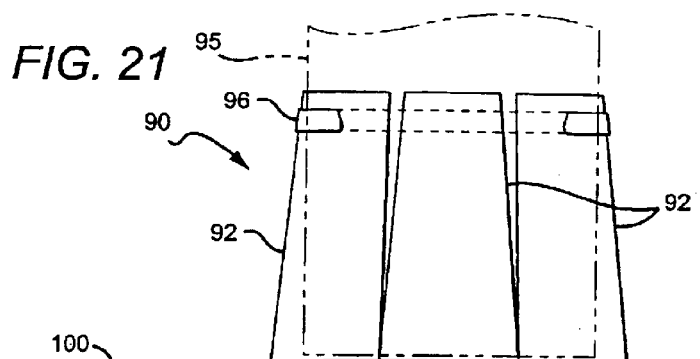
FIG. 21 is a similar view as FIG. 20 except a container is in place.

FIG. 21 shows a container 95 within leaves 92 held to container 95 by closure band 96.

Figure 22:
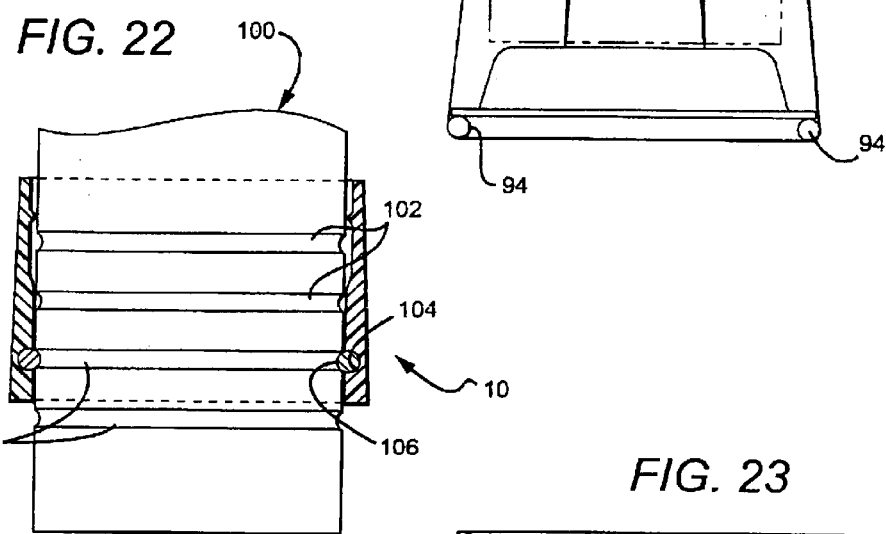
FIG. 22 is an alternate embodiment that fits like a sleeve over a container.

FIG. 22 shows another embodiment of the invention. Holder 10 is now shown as having a generally cylindrical sleeve configuration. In effect, hole 18 now includes the entire bottom. Drinkwear container 100, again, for example, a water bottle will be described, has grooves 102. Putting a contour 104 in the interior wall of holder 10 allows a coiled chemiluminescent charge container such as light stick 106 to be slid along water bottle 100 until it drops into contour 104. Chemiluminescent light stick 106 matches with the grooves 102 in the drinkwear article 100. Holder 10 can be slid along the article 100 until along the chemiluminescent charge container 106 engages a desired groove 102.

Figure 23:
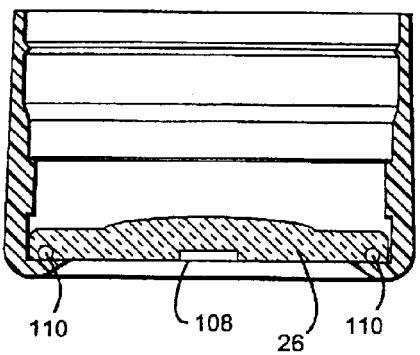
FIG. 23 is an alternate embodiment using a light diffusion disk.

FIG. 23 is a variation of FIG. 4B only transparent or translucent media disc 26 now acts as a diffuser for a coiled chemiluminescent charge container in the form of light stick 110 or a light disk 108, or both.

Figure 24:
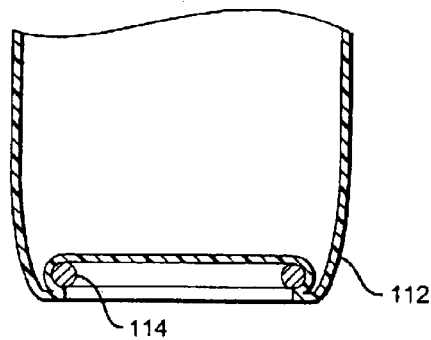
FIG. 24 is a cross sectional view of a holder with a contoured place for a light source.

FIG. 24 shows another alternate embodiment. A container 112 is specially contoured to hold a coiled chemiluminescent charge container in the form of light stick 114. This contouring of container 112 avoids the need for a separate holder. Again injection molding or other state of the art methods may be used to form the contour shown in the bottom of holder 112.

Figure 25:
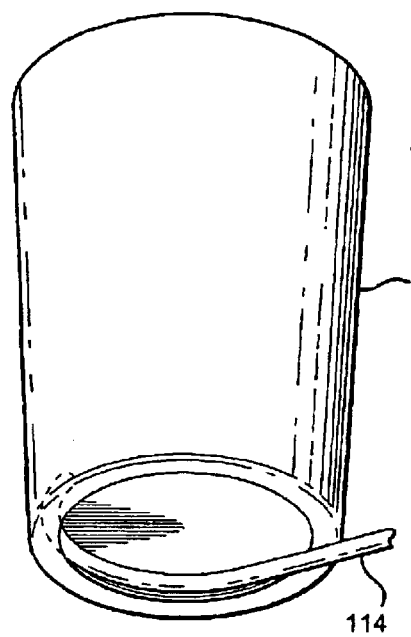
FIG. 25 is a perspective view of FIG. 24.

FIG. 25 is of an alternate perspective of FIG. 24

Figure 26:
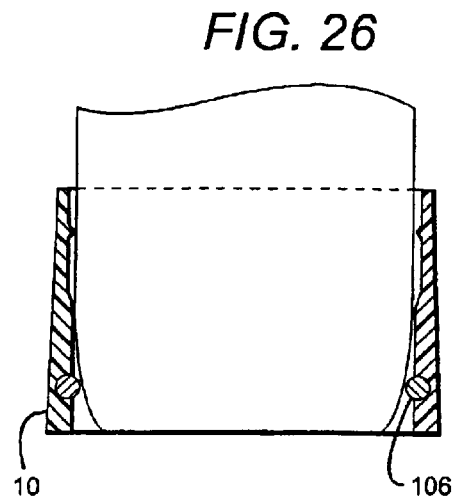
FIG. 26 is a cross sectional view of an alternate embodiment to FIG. 22.

FIG. 26 is an alternate embodiment to FIG. 22 shown and described above. This form of the holder comprises a cylinder for a container that does not have groves 102. Light stick 106 may be the same as previously described.

Figure 27:
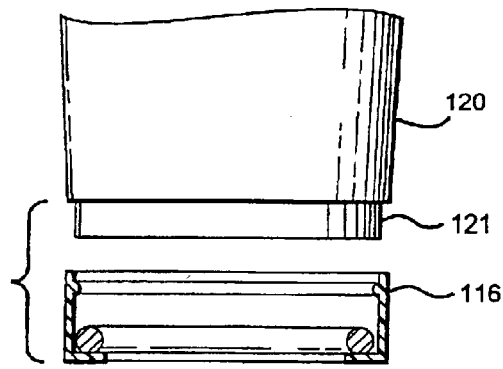
FIG. 27 is a cross sectional view of an alternate embodiment.

FIG. 27 is for a side cut away coaster style of holder 116 with a coiled chemiluminescent charge container retained therein. No snug fit is required although that remains a design option preferably, the holder 116 engages the bottom pedestal 121 of drinkwear container 120. A snug fit allows the cup's contents and/or cup to glow as held and used. The associated Light stick is fed through a side or bottom opening as described previously.

Figure 28:
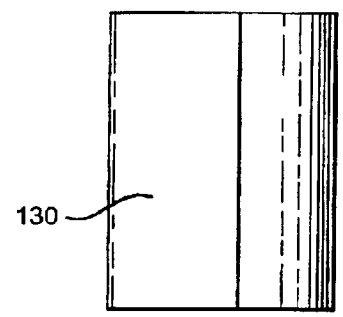
FIG. 28 is an alternate embodiment of the present invention.
Figure 29:
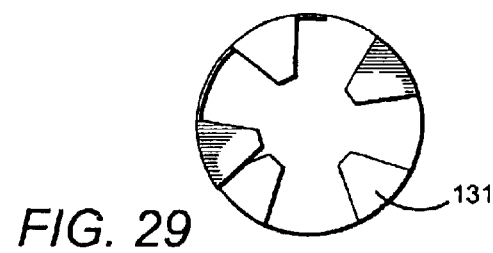
FIG. 29 is a bottom view of the FIG. 28 embodiment.

FIG. 28 is a tensioned coil design of the present invention. A clear plastic as described previously forms a sleeve 130 that is curled so it wraps around the desired drinkwear container. A fastening means, such as adhesive, rubber band or so forth may then used to hold sleeve 130 tightly wrapped to the container if there is insufficient tension in he coil. Tabs 131 may be attached to sleeve 130 as taught previously to form a bottom support structure as shown in FIG. 29. FIG. 29 is a bottom view of FIG. 28.

It is clear to those skilled in the art that other embodiments are possible. As an example, not shown, a holder may have an elastic tube attached so it may be rolled onto the container.

What has been described are preferred embodiments in which modifications and changes may be made without departing from the scope and spirit of the accompanying claims.

What is claimed is:

1. A decorative device for attachment to and illumination of a generally annular drinkwear container having an outer periphery comprising:
    a holder with an interior surface shaped to fit over a portion of said generally annular drinkwear container, and to retain a coiled chemiluminescent charge container disposed generally concentrically with said generally annular drinkwear container and generally adjacent to said outer periphery, said chemiluminescent charge container is removeable insertable through an opening in said holder; and
    a light source that fits within said holder such that light emitted by said light source passes into said container.

2. A decorative device of claim 1 wherein said holder has proximal and distal ends and includes a radially inwardly projecting ledge approximately adjacent said distal end and adapted to support said coiled chemiluminescent charge container, said proximal end being open and adapted to receive said generally annular drinkwear container, and said radially inwardly projecting ledge being adapted to prevent said generally annular drinkwear container from passing entirley through said holder.

3. A decorative device of claim 1 wherein the radially inner surface of said holder is contoured.

4. A decorative device of claim 1 wherein said holder is comprised of a light translucent material.

5. A decorative holder for attachment to and illumination of a generally annular drinkwear container, said drinkwear container having a first generally annular configuration with a closed bottom and an outer periphery, said holder comprising:
    a holder having a second generally annular configuration, a proximal end and a distal end, said holder having at least one lip, said lip projecting generally radially inwardly from approximately adjacent said proximal end, said second annular configuration being adapted to receive first generally annular configuration therein, said lip being adapted to prevent said closed bottom from passing entirely through said holder and to support a coiled chemiluminesence charge container within said holder.

6. A decorative device of claim 5 wherein said chemiluminesence charge container has a diameter of from approximately 4 to 10 millimeters and a length of from approximately 500 to 1000 millimeters.

7. A decorative device of claim 5 wherein said chemiluminesence charge container extends substantially around said outer periphery.

8. A decorative device to illuminate a drinkwear container comprising:
    A. A holder comprising:
        (i) a body of flexible material that is wrapped around the drinkwear container;
        (ii) at least one fastening element receiver associated with said body;
        (iii) a fastening element positioned at one end of said body such that when said body is wrapped around said drinkwear container said fastening element retentatively engages with said fastening element receiver;
        (iv) at least one tab connected to said body such that when said body is wrapped around the container, said tab forms a bottom to hold said drinkwear container within said body; and
    B. a chemiluminescent charge container that fits between said tab and said drinkwear container when said body is wrapped around said drinkwear container.

* * * * *